June 6, 1967 J. C. KECK ET AL 3,324,303
HIGH SPEED SCANNER FOR RADIATION MEASUREMENTS
Filed Aug. 18, 1964 2 Sheets-Sheet 1

James C. Keck
Peter E. Boniface,
INVENTORS

United States Patent Office 3,324,303
Patented June 6, 1967

3,324,303
HIGH SPEED SCANNER FOR RADIATION MEASUREMENTS
James C. Keck, Andover, and Peter E. Boniface, Danvers, Mass., assignors, by mesne assignments, to the United States of America as represented by the Secretary of the Army
Filed Aug. 18, 1964, Ser. No. 390,495
1 Claim. (Cl. 250—235)

ABSTRACT OF THE DISCLOSURE

A high speed scanner for radiation measurement of luminous hypersonic wakes having a pneumatically driven hexagonal mirror combined with a plurality of apertures and mirrors to provide numerous scans of the optical collection area and direct the image of the luminous wake onto a photomultiplier tube whose output is recorded on an oscilloscope.

This invention relates to scanning devices and more particularly to a high speed scanner for measuring the radiation from luminous hypersonic wakes.

Most of the energy of an object re-entering the atmosphere is dissipated in the wake behind the body. During the redistribution of this energy into the random thermal motion and internal energy of the air molecules, observable phenomena, such as optical emission and radar signature, are produced. These observable phenomena are a complex interaction of aerodynamic effects, chemistry, ionization, and radiation. Experimental study of these observables has been an area of much research, mostly to guide the development of a better analytical description of the wake.

The primary laboratory facility used to simulate hypersonic wake phenomena is the ballistic range, employing high performance light gas guns. Considerable effort is being expended in various laboratories to develop instrumentation to measure the wake observables. For example, highly sensitive schlieren techniques have been utilized to photograph the low-density wake. Also some photometric and spectroscopic measurements have been made. However, in none of the photometric techniques previously used have both the spatial and time resolution been closely controlled.

Accordingly, it is an object of this invention to provide an instrument for studying the luminous hypersonic wake in ballistic ranges.

Another object of this invention is to provide an instrument capable of obtaining information from which profiles of the radiation history of self-luminous hypersonic wakes can be obtained.

A further object of this invention is to provide time and spatial resolved photometric measurements of a luminous wake.

The foregoing objects of the invention, and other objects which will become apparent as the description proceeds, are achieved by an instrument utilizing a pneumatically-driven hexagonal mirror which rotates up to 3000 r.p.s. The rotating mirror is combined with a set of multiple (17 in a preferred embodiment) apertures and fixed mirrors to provide as many as 300,000 transverse scans of the optical collection area per second. The fixed plane mirrors behind each aperture direct the image of the luminous wake onto a photomultiplier tube, whose output is recorded on an oscilloscope.

Figures 1, 2:
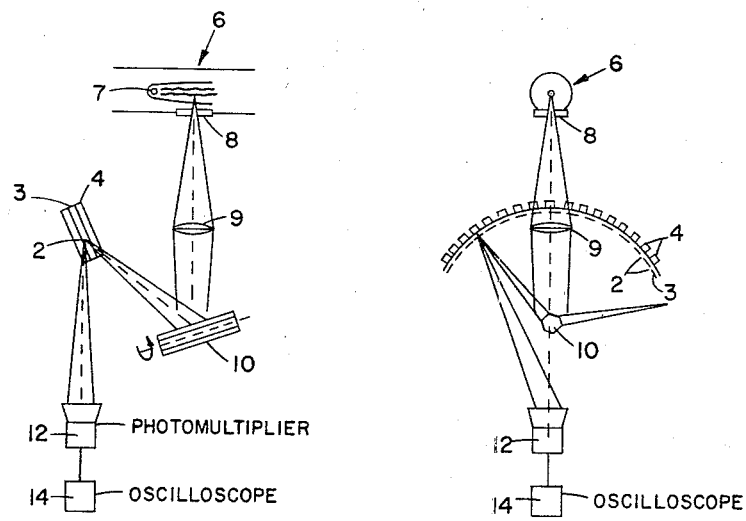
Figures 3, 4:
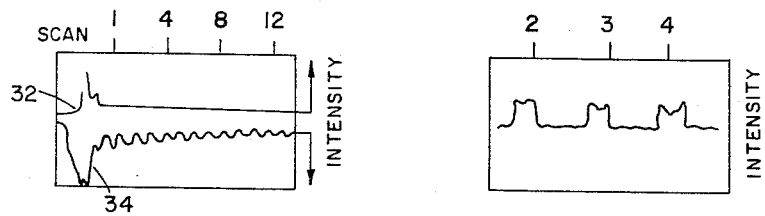
Figure 5:
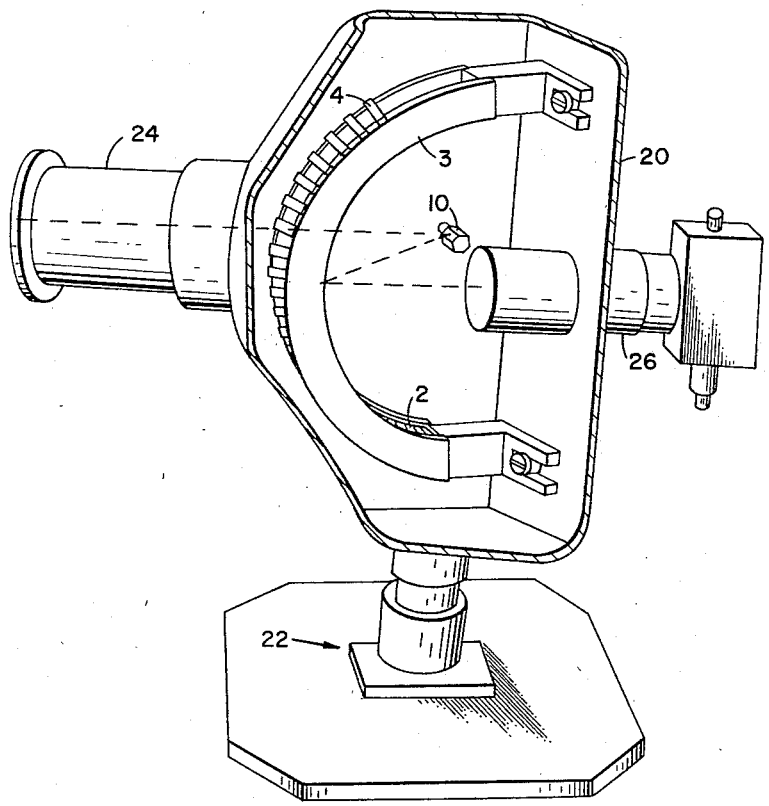

For a better understanding of the invention reference should be had to the following detailed description and the accompanying drawings wherein:

FIGURE 1 is a schematic illustration of a top view of a preferred embodiment of the invention,
FIGURE 2 is a side view of the embodiment of the invention shown in FIGURE 1,
FIGURES 3 and 4 illustrate oscillograms taken from a wake scanner according to the invention, and
FIGURE 5 is a perspective view, partly cut away, of a scanner according to the invention.

The small volume element of the wake from which the radiation intensity is to be measured is defined by rays from an aperture 2 formed in member 3 adjacent a small fixed mirror 4, illustrated in FIGURE 1. This aperture is imaged in the ballistic range test section 6 through window 8 by a lens 9. The image of the aperture is scanned across the range in a vertical plane by the revolution of a pneumatically driven six-sided mirror 10. In order to obtain more scans per rotation; i.e., per time interval, additional apertures, shown in FIGURE 2, are formed in member 3 which has the form of a circular arc and positioned about the rotating mirror. As each face of the rotating mirror sweeps across the arc, the image of each aperture in turn is scanned across the range. In the instrument described here a maximum number of 17 apertures can be used which permits 102 scans of the wake for each revolution of the mirror. At a maximum mirror speed of 3000 revolutions/sec. a scan of the wake can be made every 3.2 $\mu$sec. The radiation from the wake passed by the aperture is collected by photomultiplier 12 and recorded on an oscilloscoe 14.

The size of the volume element from which the radiation is collected depends upon both the size of the aperture and the optical magnification. The apertures are machined into sheet metal mask 3 which may be easily slid into position in front of fixed mirror 4 by means of slots in each side of the mirror assembly. Fixed mirrors 2.0-inch long by ¼-inch wide allowing for a range of aperture sizes have been found to be satisfactory.

To obtain intensity profiles across a radiating volume element, such as a wake, it is important that two successive apertures not be imaged simultaneously in the radiating area. The spacing of the images is controlled by the distance between apertures on the fixed mirror assembly (0.63-inch) and the optical magnification. When greater spacing between images is required, it is convenient to mask off enough apertures and mirrors to provide the necessary distance. Of course, the increase in spacing is accomplished with a sacrifice in the number of scans per revolution of the mirror.

Two lenses have been used in the instrument—a 7-inch focal length 2.8-inch-diameter ($f$:2.5) Aeroektar lens for work at object distances shorter than about 3.5-ft. and an Aerostigmat lens of 12-inch focal length, 2.4-inch-diameter ($f$:5.0) for longer distances. With these optics it is possible to work with optical magnifications of one to five, permitting some additional flexibility in image size and spacing. It is to be noted that the width of the limiting aperture in the wake scanner is determined by the rotating mirror (0.35-inch-width per face) and not the lens. The above lens were chosen primarily to keep the magnification small so as not to degrade the optical resolution.

The structure of the instrument is shown in FIGURE 5 wherein mask 3 is mounted in housing 20 which is supported on pedestal 22. Also mounted in housing 20 to the rear of mask 3 is the rotating mirror 10. The rotating mirror is driven by a pneumatic motor (not shown). Sleeve 24 contains focusing lens 9 and sleeve 26 at the rear of the housing contains photomultiplier tube 12. This instrument may also use several light baffles to reduce the scattered background radiation incident upon the photomultiplier.

Sample oscillograms from the wake scanner are shown in FIGURES 3 and 4. This illustrates a firing of a 0.22-inch-diameter nylon sphere into argon at 2.0 cm. Hg pressure. The optical radiation observed under such conditions is due predominantly to abiated impurities in the viscous core of the wake. The upper beam 32 of this oscillogram is the signal from photomultiplier tube 12 monitoring the radiation through a fixed, vertical slit imaged in the range. The sharp upward deflection of this beam about 10 $\mu$sec. after the beginning of the sweep is the passage of the stagnation point of projectile 7 by the slit. The photoelectric recorder (PER) and the wake scanner are arranged to view the same position in the range. Thus, top trace 32 of FIGURE 3 acts as a time mark indicating precisely when the projectile passes the wake scanner position. The lower trace 34 on the oscillogram is the signal from the scanner. It is to be noted that the sense of increasing signal, intensity, is opposite from the top trace. As the projectile passes the instrument position, the scanner records a large signal, driving the oscilloscope off scale. The sensitivity of the instrument has been set high in order to observe radiation in the far wake, and therefore, details around the body have been lost. The instrument soon recovers, and scans across the wake are obtained about every 7 $\mu$sec. or about every 4 body diameters in the wake. In the oscillogram of FIGURE 4, three of the scans are presented at a faster writing rate illustrating the detail available by this technique. In this data the dimensions of the scanning image were 0.06-inch-high by 0.12-inch-wide which affords radial resolution of about one-quarter of a body diameter and axial resolution of about one-half of a diameter.

The wake scanner described herein has been shown to be a versatile instrument for studying the luminous hypersonic wake in ballistic ranges. Profiles of the radiation intensity across the wake may be made every few body diameters with an optical resolution of a small fraction of a body diameter. In operation on a ballastic range the data from the instrument have been used to reconstruct a radiation history of the luminous wake. The intensity decay history and the width of the luminous wake can also be measured. Because of the greater sensitivity of photoelectric devices as compared to photographic film the wake scanner can provide luminous growth data further downstream in the wake than the race track technique.

By using a filter in front of the photomultiplier tube the instrument can be converted to a radiometer providing spectral as well as spatial resolution. Such an instrument would be useful for determining the chemistry and temperature of hypersonic wakes.

While this invention has been defined with reference to specific embodiments thereof, it will be appreciated that many modifications and changes may be made by those skilled in the art without departing from the spirit of the invention, as defined in the appended claim.

We claim:

A high speed scanner for transverse radiation measurements of luminous hypersonic wakes comprising: a test section for viewing said wake, a mask member having an arched configuration and having a plurality of apertures therein, a lens for imaging said apertures in said test section, a rotating multisided mirror positioned adjacent said mask for sequentially scanning said aperture images across said test section, a photomultiplier tube positioned adjacent said mask member, a plurality of fixed plane mirrors positioned adjacent said mask for directing the radiation from said wake to said photomultiplier tube, and an oscilloscope connected to said photomultiplier tube for displaying the output of said tube.

References Cited

UNITED STATES PATENTS

| | | | |
|---|---|---|---|
| 2,011,271 | 8/1935 | Cioffari | 178—7.6 |
| 2,070,460 | 2/1937 | Traub | 178—7.6 |
| 2,406,318 | 8/1946 | Brace | 250—236 X |
| 3,094,623 | 6/1963 | Weiss | 250—237 X |
| 3,205,367 | 9/1965 | Whitesell | 250—235 |

RALPH G. NILSON, *Primary Examiner.*

WALTER STOLWEIN, *Examiner.*

J. D. WALL, *Assistant Examiner.*